(12) United States Patent
Jurski et al.

(10) Patent No.: US 11,960,439 B2
(45) Date of Patent: Apr. 16, 2024

(54) SCALABLE MCTP INFRASTRUCTURE

(71) Applicant: Intel Corporation, Santa Clara, CA (US)

(72) Inventors: Janusz Jurski, Beaverton, OR (US); Myron Loewen, Berthoud, CO (US); Mariusz Oriol, Gdynia (PL); Patrick Schoeller, Cypress, TX (US); Jerry Backer, Marlborough, MA (US); Richard Marian Thomaiyar, Trichy (IN); Eliel Louzoun, Jerusalem (IL); Piotr Matuszczak, Rumia (PL)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 17/690,950

(22) Filed: Mar. 9, 2022

(65) Prior Publication Data
US 2022/0197859 A1    Jun. 23, 2022

(51) Int. Cl.
*G06F 15/82*    (2006.01)
*G06F 21/62*    (2013.01)

(52) U.S. Cl.
CPC .......... *G06F 15/82* (2013.01); *G06F 21/6218* (2013.01)

(58) Field of Classification Search
CPC .............................. G06F 15/82; G06F 21/6218
See application file for complete search history.

(56) References Cited

U.S. PATENT DOCUMENTS 9,411,762 B2 * 8/2016 Natu ................ G06F 13/385
11,546,304 B2 * 1/2023 Smith ................ H04L 63/0272
2013/0346666 A1 * 12/2013 Chang .................. G06F 15/17
    710/305
2014/0281070 A1 * 9/2014 Natu .................. G06F 13/385
    710/105
2022/0116322 A1 * 4/2022 Pamu .................. H04L 45/72

OTHER PUBLICATIONS

PMCI Working Group of the DMTF, OCP Global Summit, Mar. 14-15, 2019.*
MMCTP20071129, Nov. 29, 2007.*

* cited by examiner

*Primary Examiner* — Henry Tsai
*Assistant Examiner* — Christopher A Daley
(74) *Attorney, Agent, or Firm* — Compass IP Law PC

(57) ABSTRACT

Methods and apparatus for scalable MCTP infrastructure. A system is split into independent MCTP domains, wherein each MCTP domain uses Endpoint Identifiers (EIDs) for endpoint devices within the MCTP domain in a manner similar to conventional MCTP operations. A new class of MCTP devices (referred to as a Domain Controllers) is provided to enable inter-domain communication and communication with global devices. Global traffic originators or receivers like a BMC (Baseboard Management Controller), Infrastructure Processing Unit (IPU), Smart NIC (Network Interface Card), Debugger, or PROT (Platform Root or Trust) discover and establish two-way communication through the Domain Controllers to any of the devices in the target domain(s). The Domain Controllers are configured to implement tunneled connections between global devices and domain endpoint devices. The tunneled connections may employ encapsulated messages with outer and inner headers and/or augmented MCTP messages with repurposed fields used to store source and destination EIDs.

23 Claims, 7 Drawing Sheets

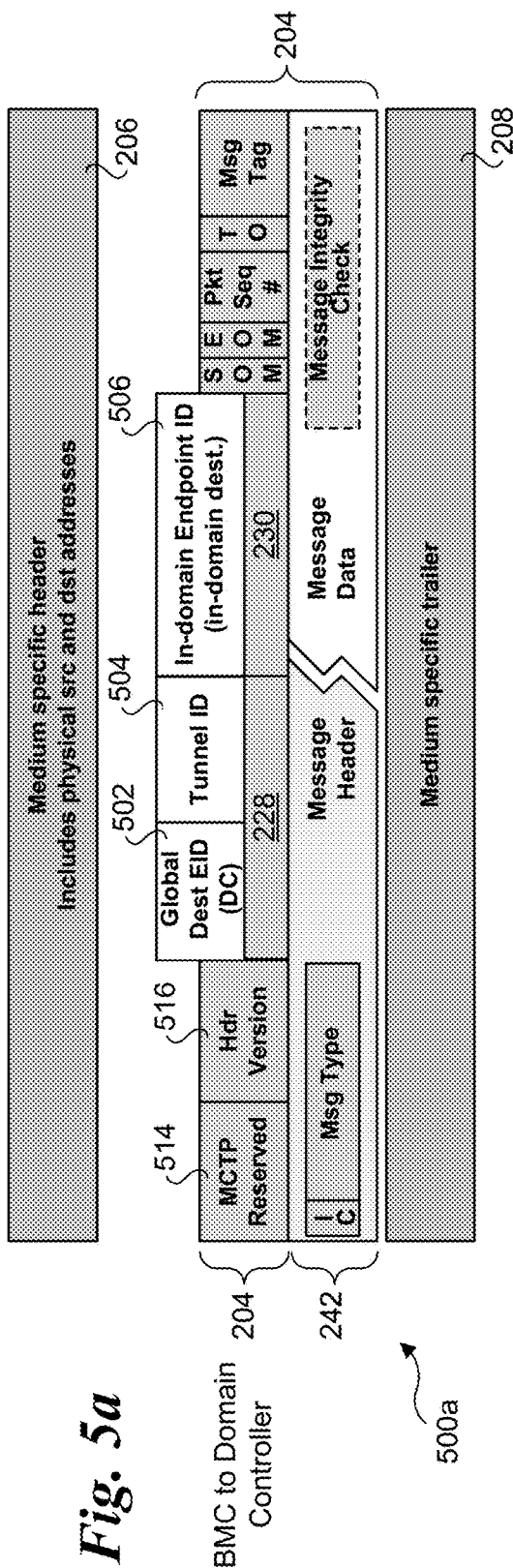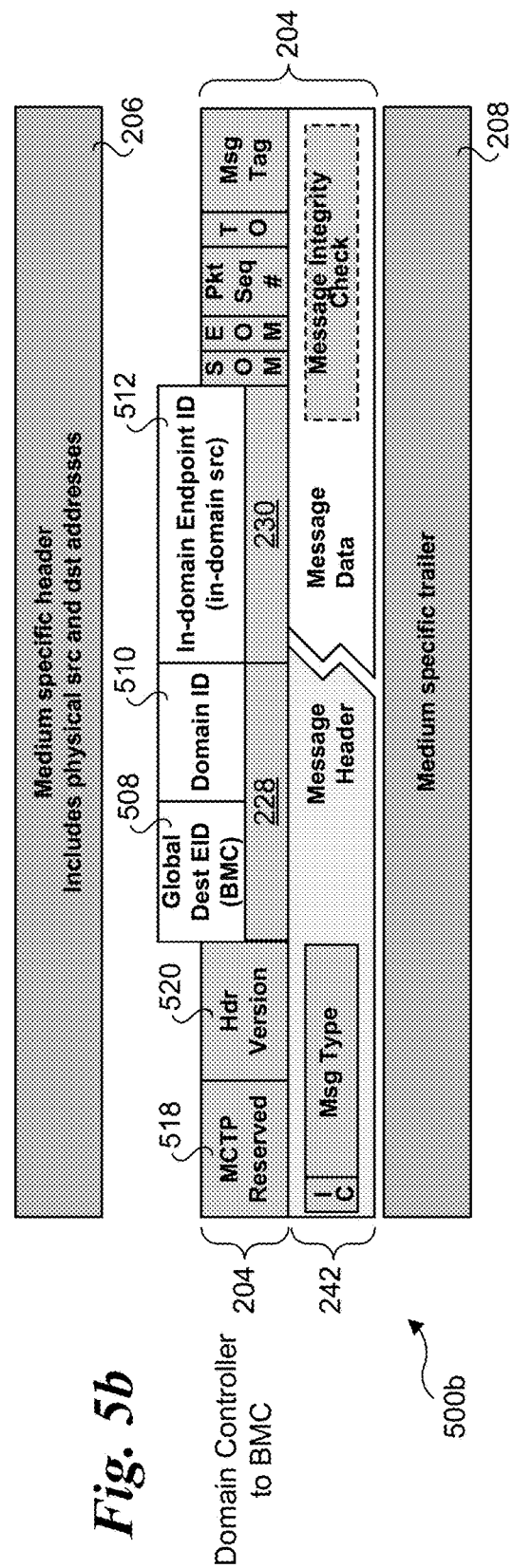

SCALABLE MCTP INFRASTRUCTURE

BACKGROUND INFORMATION

MCTP (Management Control Transport Protocol) is the main protocol used by today's platforms to manage devices within the platform, such as but not limited to endpoint devices. MCTP uses 8-bit device Endpoint Identifiers (EIDs) to uniquely identify devices in the system, limiting the size of the system. Systems hit this scalability limit of MCTP because of the growing number of devices adopting MCTP, growing number devices in total per system, and some devices using multiple EIDs.

This limits scalability, which has been recognized at the industry level. For example, the DMTF (Distributed Management Task Force) PMCI (Platform Management Communications Infrastructure) Working Group (WG) has started to define the problem formally under the umbrella name of MCTPv2 (MCTP version 2). However, current proposals for MCTPv2 would require industry-wide adoption by all endpoint device vendors, that is, all the devices in the market, coming from numerous vendors, which would need to adopt the new format. Adoption typically requires HW/Si (Hardware/Silicon) changes so it would take years to be implemented. This would also mean significant cost, new implementation issues/defects, and compatibility challenges.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5a is a diagram illustrating a message format comprising an augmented MCTP packet in which the destination EID header field is repurposed to store an Global Destination EID for a Domain Controller and a Tunnel ID, and the source EID header field is repurposed to store an EID for a destination domain endpoint device;

FIG. 5b is a diagram illustrating a message format comprising an augmented MCTP packet in which the destination EID header field is repurposed to store a Global Destination EID for a BMC and a Domain ID, and the source EID header field is repurposed to store an EID for a source domain endpoint device.

DETAILED DESCRIPTION

Figure 1:
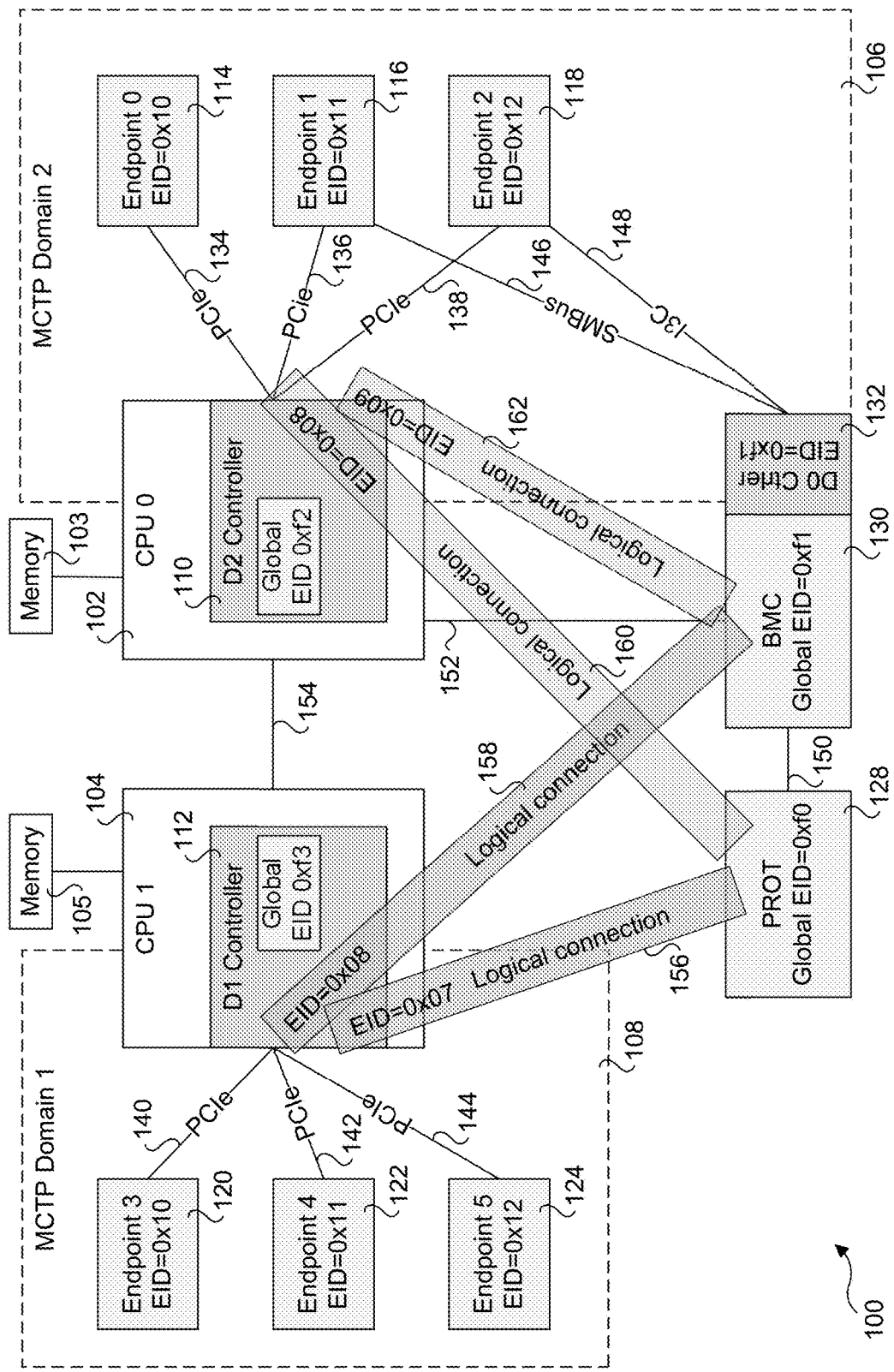
FIG. 1 is a schematic diagram of a two-socket system in which two independent MCTP domains are implemented.

Embodiments of methods and apparatus for scalable MCTP infrastructure are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a system, such as a multi-socket platform, is split into independent MCTP domains, each domain supporting up to ~256 EIDs and behaving exactly as the MCTP network behaves today. A new class of MCTP devices (referred to as a Domain Controllers) are provided to enable inter-domain communication or communication with global devices. Global traffic originators or receivers like a BMC (Baseboard Management Controller), Infrastructure Processing Unit (IPU), Smart NIC (Network Interface Card), Debugger, or PROT (Platform Root or Trust) discover and establish two-way communication through the Domain Controllers to any of the devices in the target domain. In one embodiment, endpoint devices can communicate through the Domain Controller to any global device but not communicate with devices in other domains unless enabled by the Domain Controllers (as detailed below).

While the solution supports scalability (as detailed below), it also minimizes changes to current MCTP infrastructure. For example, the MCTP packets used by the solution conform sufficiently to MCTPv1 for routing through existing bridges, physical layers, and hardware MCTP implementations so usually only firmware updates of global devices and Domain Controllers are needed to enable scalability beyond current MCTP limits. Meanwhile, existing managed endpoint devices can be used without any changes.

As discussed above, under the solutions disclosed herein, a system is split into multiple independent MCTP domains, with each MCTP domain working independently from other MCTP domains. In one embodiment, each MCTP domain supports up to approximately 256 EIDs. Within each MCTP domain, EID assignment and routing will be performed in the same manner as in today's single MCTP domain systems. EIDs in a given domain are independent and can overlap with EIDs in another domain.

Within each domain, there is at least one Domain Controller (DC). Generally, a DC may be implemented within a processor or the like (aka Central Processing Unit or CPU), as processors also implement the PCIe root port functionality and are a natural point where the system can be split into MCTP domains. Multiple DCs per domain may exist, as illustrated in FIG. 1 and described below. For example, a Baseboard Management Controller (BMC) may include a DC used for SMBus devices.

An example of the foregoing principles and concepts as applied to a two-socket system 100 is shown in FIG. 1. System 100 includes a pair of CPUs 102 and 104 (also labeled CPU 0 and CPU 1) respectively coupled to memory 103 and 105. Each of CPUs 102 and 104 associated with a respective socket and a respective MCTP domain 108 and 106 (also labeled MCTP Domain 1 and MCTP Domain 2). Each of CPUs 102 and 104 include a respective domain controller 110 and 112 (also labeled D2 controller and D1 controller, respectively). MCTP Domain 2 includes three endpoint devices 114, 116, and 118 (also labeled Endpoint 0, Endpoint 1, and Endpoint 2, respectively). Similarly, MCTP Domain 1 includes three endpoint devices 120, 122, and 1124 (also labeled Endpoint 3, Endpoint 4, and Endpoint 5, respectively). System 100 also includes a Platform Root of Trust (PROT) device 128 and a BMC 130 including a second Domain 2 controller 132 used for SMBus/I3C devices.

In some embodiments, one or more of Endpoint devices 0-5 comprise PCIe endpoint devices that are coupled via a respective PCIe link to the CPU associated with the MCTP domain to which the endpoint devices are assigned. Optionally, other types of links may be used including but not limited to Compute Express Link (CXL) links, SMBus, USB, serial, etc. These PCIe links include PCIe links 134, 136, and 138 coupled between CPU 102 and endpoint devices 114, 116, and 118, respectively, and PCIe links 140, 142, and 144 coupled between CPU 104 and endpoint devices 120, 122, and 124. In addition to the PCIe links shown, the endpoint devices would include applicable PCIe interfaces, while CPUs 102 and 104 would include applicable PCIe interfaces and circuitry, such as a PCIe Root Controller and one or more PCIe Root Ports.

In addition to PCIe links and CXL links, other types of links employing other protocols may also be used for communication between pairs of system components. For example, system 100 further shows an SMBus link 146 coupled between BMC 130 and endpoint device 116, and an I3C link 148 coupled between BMC 130 and endpoint device 118. PROT device 128 is coupled to BMC 130 via a link 150, while BMC 130 is coupled to CPU 102 via a link 152. In addition, CPUs 102 and 104 a coupled via a socket-to-socket interconnect 154.

System 100 employs a combination of local EIDs implemented for devices within a respective MCTP domain and Global EIDs are assigned to devices that may be accessed on a global level within the system. This enables a system to employ multiple instances of the same EIDs within respective MCTP domains. For example, each of MCTP domains 0 and 1 include endpoint devices with EIDs 0x10, 0x11, and 0x12. Note that the EIDs in each MCTP domain are independent so they do not have to be the same. Additionally, since EIDs are assigned per bus, so for devices 114, 116, and 118, the EID on PCIe links (136, 138) may be different than the EIDs on SMBus or I3C links (146, 148).

Under protocols such as PCIe, endpoint devices within an MCTP domain can be enumerated during boot/system initialization, with EIDs being assigned at that time, in accordance with conventional MCTP operations. Optionally, a system may support "hot-swapping" of endpoint devices under which an endpoint device may be added or removed from a system during system runtime. When an endpoint device is added to a system during runtime, the endpoint device is identified and assigned a new EID.

Communication within each domain generally happens between the DC(s) and the endpoints (only). Generally, a system may include a (relatively) small number of global devices, which includes the DCs and other devices that are shared across the platform: in FIG. 1 these global devices further include PROT device 128 and BMC 130. These non-DC global devices may need to communicate with various endpoints in the system and this communication may be facilitated by DCs that are operated as proxies for the non-DC global devices. Note that BMC actually acts both as a DC (for Domain2) but it is a regular global device from the perspective of Domain 1. For this communication to happen, global devices establish a logical connection (LC) to each DC, as shown in FIG. 1 by "pipes" 156, 158, 160, and 162. In some embodiments, LCs are generally static during system runtime (established at the system bring-up time and stay until system shutdown/reset) but dynamic LCs are possible, as well. Control commands are defined to discover, establish, or tear down LCs.

Each LC is assigned an EID within the target domain to represent the global device that established the connection. This EID represents the global device, but it is maintained and serviced by the DC that setup the LC, with the DC acting as a simple proxy, as follows.

Whenever a global device sends a MCTP packet to an endpoint, it uses the applicable LC to deliver the MCTP packet to the DC, and the DC simply forwards the packet further to the endpoint, using a conventional MCTP message forwarding mechanism within the target domain. In the reverse direction, when an endpoint sends a MCTP packet to the global device (typically in response to an earlier request sent by the global device), it is directed to the EID representing the global device in the domain and it reaches the DC. The DC then forwards the packet to via the appropriate LC to the global device. In one embodiment there is a 1:1 mapping between EIDs and LCs (for EIDs assigned to LCs).

Figure 1A:
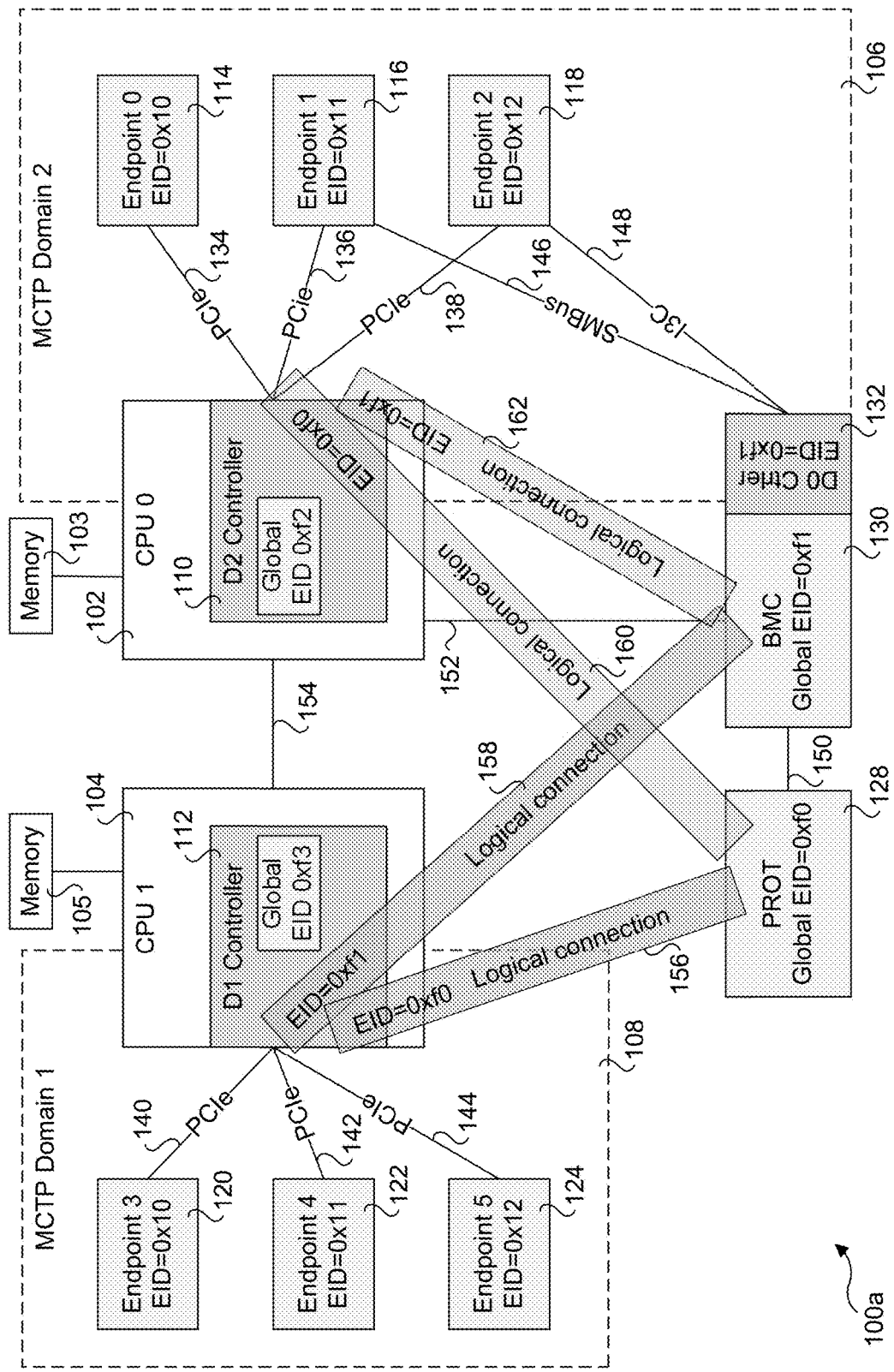
FIG. 1a is a schematic diagram illustrating an augmented version of the two-socket system of FIG. 1 under which the logical connections employ global EIDs.

Under an embodiment of a simplified approach, a pool of global EIDs is statically reserved in each domain, where the EIDs would never be used by endpoint devices but are reserved for global devices. For example, as shown in system 100a of FIG. 1a, EIDs 0xf0 and 0xf1 are reserved, where PROT device 128 and BMC 130 are represented in every domain at the same EID=0xf0 and EID=0xf1, respectively. (It is noted the reserved EIDs do not need to be consecutive but can span multiple EID ranges/polls, allowing more flexibility.) In this embodiment, the LCs share the same EID as the global device (PROT device 128) and BMC 130) to which they are connected.

The reserved EIDs do not need to be the same in each domain but this approach, which allows each global device to exist "virtually" in multiple domains with the same EID, has an important benefit simplifying the implementation and speeding up adoption: a single routing table at the DC can be used because there are no overlapping EID entries within each DC, while still allowing each endpoint to reach the global endpoints. MCTP implementations today normally implement only one routing table, so this approach allows compatibility with existing hardware.

Generally, the LC is a logical concept, and any types of protocols can be used to discover, establish, or maintain LCs and carry MCTP packets across LCs. These protocols include but are not limited to the two protocols described below, which are particularly well suited to carry packets via LCs in today's MCTP systems: (1) a short-term solution based on physical addressing of MCTP packets that can work in any endpoint; and (2) a longer-term solution based on MCTP-in-MCTP tunneling. For this later approach a generic solution is provided allowing theoretically unlimited scalability but also a header compression scheme is shown that enables scalability in practical implementations on today's hardware.

Physical Addressing

Physical addressing of MCTP packets assumes that the global devices are directly coupled, which is generally the case in current systems that use PCIe, for example. Global devices use a physical MCTP addressing method to forward packets to/from DCs, such as using PCIe Bus:Device.Function notation. Alternatively, Route to Root Complex routing may be used in cases where the DC is within the root complex. Under the PCIe Bus:Device.Function approach, a BMC puts the MCTP packet content (with the EID representing the BMC within the target domain as the source EID) in a PCIe format with Bus:Device.Function targeting the DC—this packet will reach the DC without issues as it is forwarded by the PCIe fabric using the Bus:Device.Function information and the embedded EID does not matter. On the other hand, the DC will act as a MCTP bridge and forward the packet to the right endpoint device because the EID is set correctly by the BMC. Under an exception, EID=0 may be used to allow targeting the DC, as opposed to forwarding the packet to the domain. This approach is compatible with the current MCTP specification under which EID=0 is a reserved non-routable EID. This approach leverages the fact that MCTP packet forwarding on a bus only considers the physical address and ignores the destination EID in the MCTP packet.

An advantage of the physical addressing approach is simplicity of implementation by the global devices. First, the implementation selects the right physical address, and the remaining content is the same as conventional MCTP packet data. This approach is also compatible with the majority of existing hardware. On the other hand, physical addressing cannot carry packets across different media when MCTP bridging is required. This limitation is addressed by the following tunneling approach.

Tunneling

Figure 2:
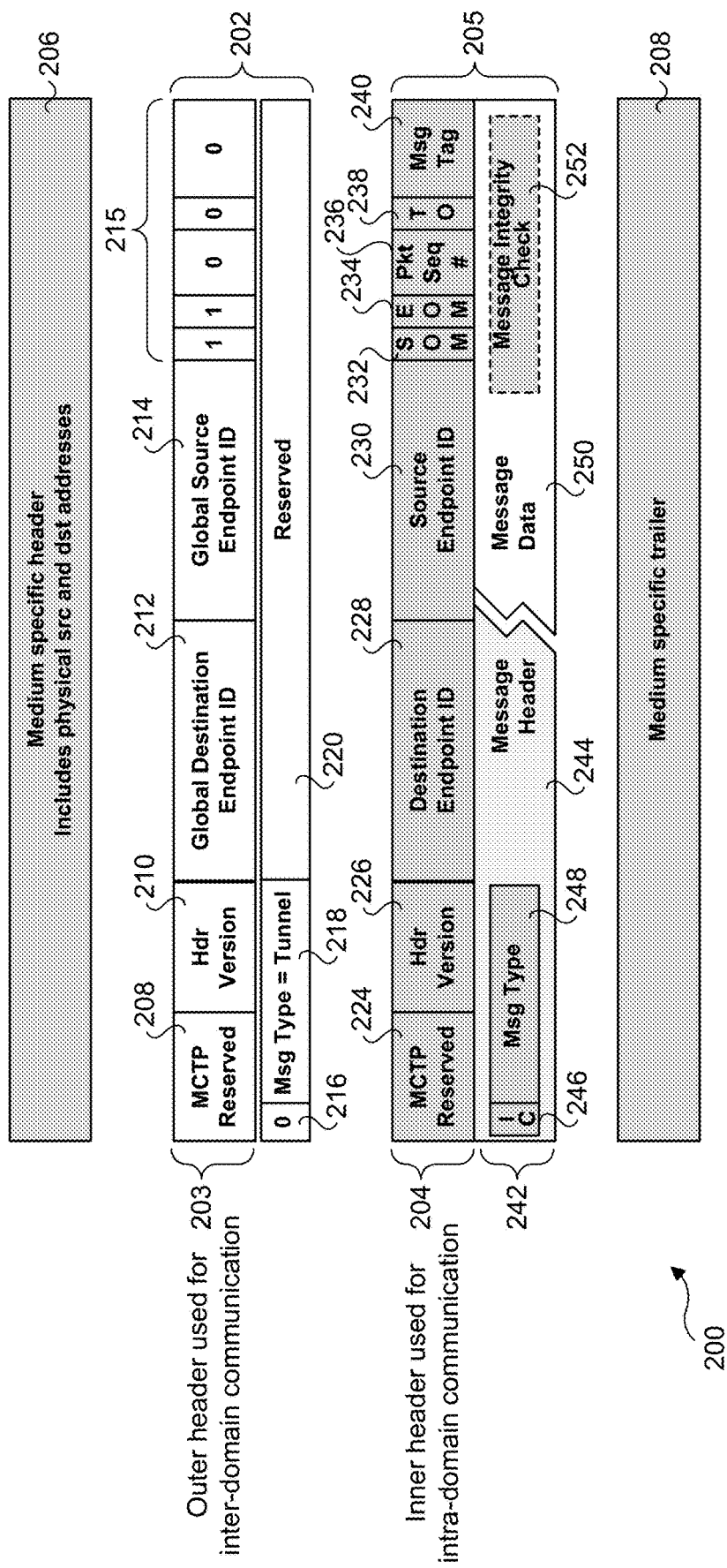
FIG. 2 is a diagram illustrating a message format employing MCTP-in-MCTP encapsulation under which an MCTP outer header is added in front of an inner MCTP header that is part of an MCTP inner packet, according to one embodiment.

Under an aspect of tunneling, MCTP-in-MCTP encapsulation is used to enable an LC to communicate over a conventional MCTP connection between global devices. This enables any MCTP-based protocols to be used to carry MCTP message content via an LC. As an example, FIG. 2 shows a message format 200 employing MCTP-in-MCTP encapsulation under which an MCTP outer header 202 including an augmented MCTP transport header 203 is added in front of an inner MCTP transport header 204 that is part of an MCTP inner packet 205. These MCTP outer and inner headers are preceded by a medium specific header 206 including physical source and destination addresses and followed by a medium specific trailer 208.

MCTP outer header 202 is an outer header used for inter-domain communication that has a format that employs a variant of a conventional MCTP transport header that includes an 4-bit MCTP reserved field 208, a 4-bit header version field 210, an 8-bit global destination endpoint ID field 212, an 8-bit global source endpoint ID field 214, an 8-bit set of message flags/fields 215, a 1-bit MCTP Integrity Check (IC) flag 216, a 7-bit message type field 218, and 24-bit reserved field 220. In MCTP outer header 202, the IC flag is set to '0' to indicate there is not integrity check and the message type 218 value is set to indicate the MCTP message type is a "tunnel." In one embodiment, setting the message type to "tunnel" causes the flags and fields for message flags/fields 215 to be ignored.

Inner MCTP transport header 204 is a 32-bit inner header used for intra-domain communication comprising conventional MCTP transport header fields including a 4-bit MCTP reserved field 224, a 4-bit header version field 226, an 8-bit destination endpoint ID field 228, and an 8-bit source endpoint ID field 230. Next, are an 8-bit set of message fields including a 1-bit Start of Message (SOM) flag 232, a 1-bit End of Message (EOM) flag 234, a 2-bit packet sequence #field 236, a 1-bit Tag Owner (TO) flag 238, and a 3-bit message tag 240. In outer MCTP transport header 203, these flags and fields comprise message flags/fields 215 discussed above. Following the MCTP transport header is the MCTP packet payload 242 which comprises a message header 244 including an MCTP IC bit 246 and a 7-bit message type field 248. The message header fields are followed by variable-length message data 250 that may include an optional message integrity check 252.

Message format 200 may be used for sending messages to or from global devices. For example, when a BMC sends a packet to an endpoint in a target domain (e.g., domain 2), it should set the relevant fields as follows:

Destination Endpoint ID=endpoint EID in the target domain

Source Endpoint ID=EID representing BMC in the target domain

Global Destination Endpoint ID=EID of the DC

Global Source Endpoint ID=EID of the BMC at the global level

Message type in the outer header is set to indicate that it is a tunnel (this allows the DC to differentiate between packets that need to be forwarded to the domain vs packets targeting the DC—e.g., control commands used to setup the tunnel)

When the DC receives the packet, it recognizes it is a tunneled content, and it removes the outer header and forwards the inner packet to the endpoint within the domain according to conventional MCTP rules.

When using tunneling, the LC can be established with conventional MCTP mechanisms, including MCTP bridging via different media. (It is noted that bridging is not possible under the physical addressing method described earlier.) Another advantage of the tunneling method is that it can be used in a multi-level approach allowing theoretically unlimited scalability—tunneled traffic can be carried in another tunnel and the number of tunneling levels is basically unlimited (within practical limits, of course).

A disadvantage of the tunneling method is that (1) it may be more complex to implement than the physical addressing method (2) it increases packet size. The packet size may have to be addressed if the original (inner) packet is already at or close to the maximum size the physical medium or hardware buffers can accept.

It is further noted that as an alternative for a given device becoming a global device, LCs can be established between different domains allowing endpoints from one domain to communicate with endpoints in another domain (both endpoints unaware that they are working in a multi-domain system). This can be simply achieved with use of a dedicated global bridging device (a domain-to-domain bridge) that establishes LCs to both domains and bridges packets between these domains. Despite its simplicity, a disadvantage of this approach is that an additional device is employed in packet forwarding and the traffic flows in an indirect way in the MCTP network.

Figure 3:
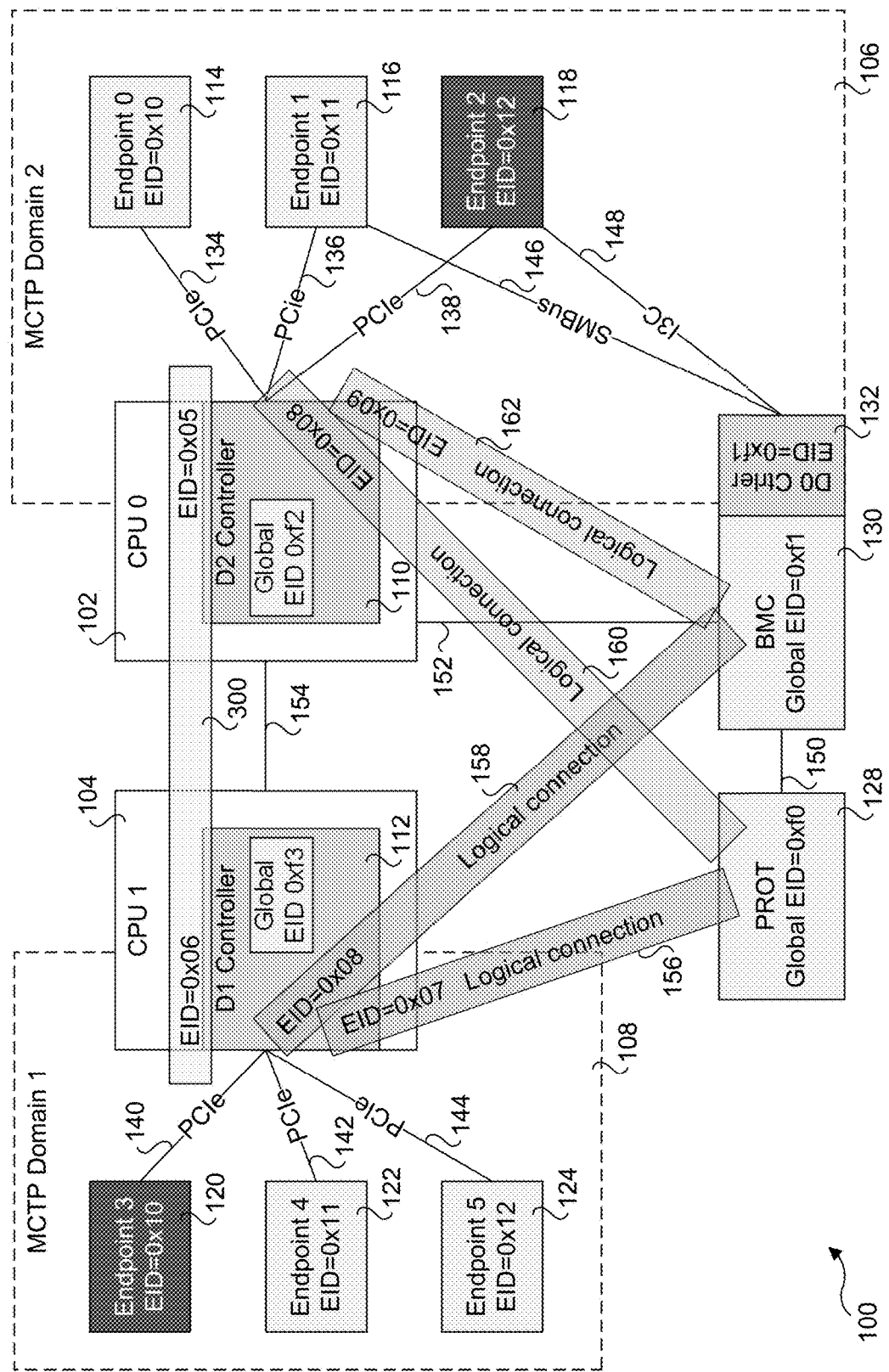
FIG. 3 is a schematic diagram illustrating the two-socket system of FIG. 1 and further illustrating communication between endpoint devices in separate MCTP domains using a logical connection implemented over a socket-to-socket link between the two sockets.

A more efficient approach is to collocate the domain-to-domain bridge function in one of the DCs, allowing direct DC-to-DC forwarding. Only one LC is needed with this approach. An example of such inter-domain communication between endpoint 120 in MCTP domain 1 and endpoint 118 in MCTP domain 2 is shown in FIG. 3. In this example, an LC 300 is established using D1 controller 112 and D2 controller 110. As shown, the EIDs at the respective ends of LC 300 are EID=0x06 and EID=0x05. The physical medium used for transferring data over LC 300 is socket-to-socket interconnect 154 coupled between CPU 1 and CPU 0. As further illustrated, the physical media from endpoint 120 to CPU 1 is PCIe link 140, and the physical media from CPU 0 to endpoint device 118 is PCIe link 138. Note that such a domain-to-domain bridging, regardless of the implementation (a dedicated or collocated bridge), would generally be initiated and controlled by a global device that knows the overall topology of the system (such as a BMC). BMC would also typically configure the endpoints to send/receive such inter-domain communication.

Header Compression

Figure 4A:
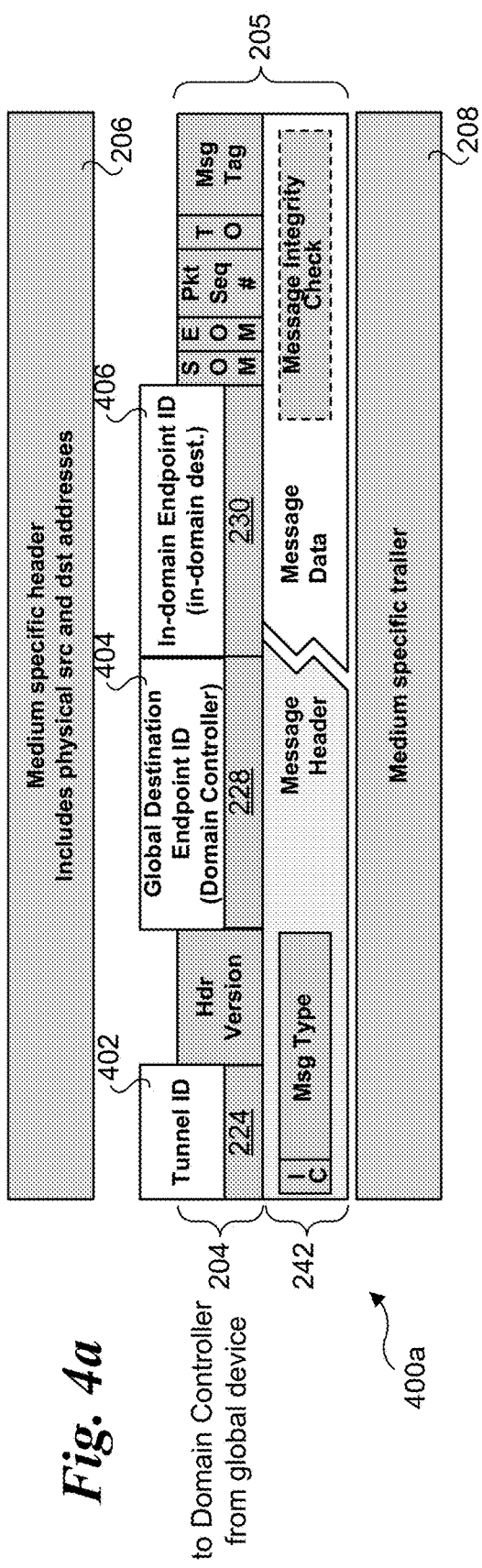
FIG. 4a is a diagram illustrating a message format comprising an augmented MCTP packet in which destination and source EID header fields are repurposed to store a Global Destination EID for a Domain Controller and an EID for a destination domain endpoint device.
Figure 4B:
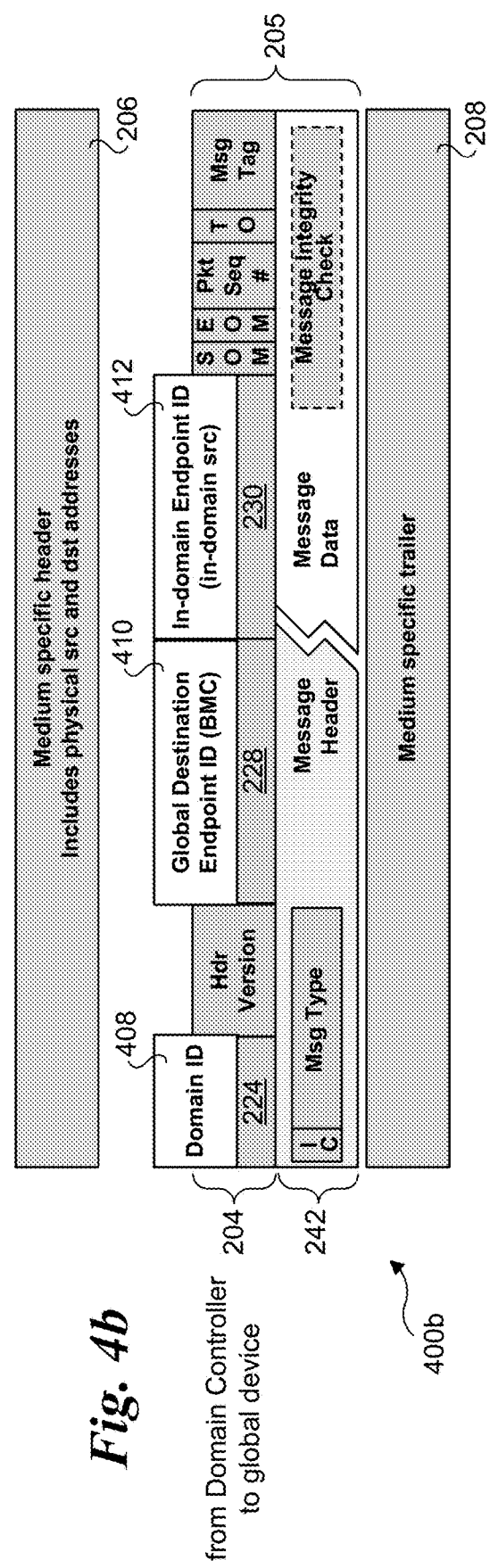
FIG. 4b is a diagram illustrating a message format comprising an augmented MCTP packet in which in which destination and source EID header fields are repurposed to store a Global Destination EID for a BMC and an EID for a source domain endpoint device.

To address potential packet size issues, if the number of tunnels and domains are limited (which will generally be the case), an MTCP header may optionally be compressed back, thus eliminating the aforementioned disadvantage of using tunneling. Examples of compressed formats 400a for a message originating from a global device and destined for a DC and a compressed format 400b for a message originating from DC and destined for a global device are respectively shown in FIGS. 4a and 4b.

The fields and flags in both compressed formats 400a and 400b are the same as illustrated in FIG. 2 for MCTP inner packet 205, except values for selected fields shown in white blocks for MCTP transport header 204 are different. For example, under compressed format 400a, MCTP reserved field 224 is repurposed as a tunnel ID field 402, while the global destination endpoint ID of the destination controller is stored in destination endpoint ID field 228. An in-domain endpoint ID 406 for the in-domain destination endpoint device is stored in source endpoint ID field 230.

Under compressed format 400b, MCTP reserved field 224 is repurposed as a Domain ID field 408, while the global destination endpoint ID 410 of the BMC (or another global device) is stored in destination endpoint ID field 228. An in-domain endpoint ID 412 for the in-domain source endpoint device is stored in source endpoint ID field 230.

Under each of compressed packet formats 400a and 400b, a medium specific header 206 including physical source and destination addresses proceeds the MCTP packet, which is followed by a medium specific trailer 208. For example, for PCIe medium specific header will include physical PCIe addresses for the source and destination.

As shown in format 400a and described above, when a global device is sending a packet to the DC, the fields are set as follows:

Destination EID—is set to the DC EID, which enables packet forwarding according to conventional MCTP rules, including bridging Source EID—is set to the endpoint EID within the target domain Tunnel ID—this is a newly added field that uses reserved bits in the MCTP header. This field is used to indicate:
1) If non-zero: the packet should be forwarded by the DC and the value of the field identifies the global device—during tunnel setup a unique ID is assigned by the DC to each device
2) If zero (legacy): This is used to indicate the packet is a conventional MCTP packet and the packet should not be forwarded by DC to the domain After being sent by the source global device, the forgoing packet (using format 400a) is forwarded to the target DC using the regular MCTP routing/bridging mechanisms that are normally available at the global level. Once it reaches the target DC, it is handled by the DC in the following manner. When the DC receives the packet Tunnel ID field 402 is inspected to determine if the packet should be forwarded. If so, prior to forwarding the packet, the Source EID value is copied into the Destination EID, and the Source EID is set to the EID that represents the global device within the domain; the tunnel ID may be used to determine this value.

In the other direction (from endpoint device to DC), when the endpoint device sends a packet to the EID representing the global device, it is forwarded/bridged to the DC using the regular MCTP mechanisms. When the DC receives a packet from the endpoint device it will perform the following operations before sending the packet to the global device. The DC will set the Destination EID to address the global device—the EID that represents the global device within the domain directly maps to this value. Domain ID field 408 is also set to indicate the domain ID—as discussed above, this is a new field that repurposes the reserved bits in the MCTP reserved field 224. Setting the value of Domain ID to zero means that it is a conventional MCTP packet, and it has not been forwarded by the DC from the domain, but the DC sent the packet itself. A non-zero value for Domain ID field 408 indicates the domain ID from which the packet arrived.

In one embodiment, a packet having compressed packet format 400b is handled by the target global device is as follows. Upon receipt of the packet, Domain ID field 408 is inspected to determine if the packet is a forwarded packet. If it is a forwarded packet, the Source EID indicates the endpoint ID in the domain and the Domain ID identifies the domain from which the packet arrives.

The compressed packet formats 400a and 400b add complexity in the DC and global device implementation but does not increase packet size and is still fully transparent to the endpoint devices. Compressed packet formats 400a and 400b also maintain the advantage that LCs can be established using conventional MCTP connections, including MCTP packet bridging. A limitation of the compressed formats is that the number of domains is limited to 15 domains due to the 4-bit number proposed to store Domain ID information (domain ID zero has a special meaning as stated above).

An observation can be made here that leads to further compression. For a particular Tunnel ID in traffic from the DC, the Global Destination Endpoint ID will always be the same. Likewise, for a particular Domain ID in traffic to a DC, the Global Destination Endpoint ID will always be the same. In other words, the majority of EID values in the Global Destination Endpoint ID is never used. For this reason, it is possible to allocate multiple EIDs for one global device and for DCs to encode the domain identification and global device information.

In consideration of the foregoing characteristics, in one embodiment the Tunnel ID and Domain ID are packed into the Global Destination ID, such as shown in compressed packet formats 500a and 500b in FIGS. 5a and 5b. As shown in FIG. 5a, for packets originating from the BMC and proxied to an endpoint device via a domain controller, a global destination EID 502 for the DC and a Tunnel ID 504 are stored in destination endpoint ID field 228. An in-domain endpoint ID 506 for the in-domain destination endpoint device is stored in source endpoint ID field 230. As shown in FIG. 5b, for packets originating from an endpoint device and proxied to a BMC via a domain controller, a global destination EID 508 for the BMC and a Domain ID 510 for the domain are stored in destination endpoint ID field 228. An in-domain endpoint ID 512 for the in-domain source endpoint device is stored in source endpoint ID field 230.

Assuming that there are typically only about up to 4 to 8 global devices in the system, the Tunnel ID 504 can be 2 or 3 bits. This allows the Domain ID to be expanded to 5 or 6 bits without modifying the original MCTP header format. As a further expansion, if the other reserved bits 514 and 518 in the MCTP header are used as additional space to encode domain information, up to 10-bits may be used for Domain ID encoding while still maintaining compatibility with existing MCTP devices, even those that incorrectly interpreted the byte for Version. This also simplifies the header to be the same regardless of packet direction.

An additional requirement under this approach is that the DC and global devices need to listen to more than one destination endpoint. This can be addressed in one embodiment by masking for the Domain ID in the DC so that it ignores the Tunnel ID and likewise masking for the Tunnel ID in the global devices.

Under the compression scheme in FIGS. 5a and 5b the ability to send traffic from the global device directly to a discovery/configuration endpoint within the DC is lost. In one embodiment this is addressed by making each DC interpret In-domain Endpoint ID=0 as its endpoint. The MCTP spec reserved Endpoint=0 for when a physical address is used instead of EID. Since the global device already cannot use physical addressing behind the DC, no system functionality is compromised.

Generally, the modified compressed MCTP header may or may not have an indication of its overridden EID parameters. This could be done setting one of the reserved bits in the header to a predefined value, such as '1', for example. If there are a mixture of DC and endpoints directly on the same network as the global devices, then there would be a mixture of packet types to discern. No device other than the targeted global device needs to be aware of the difference and by careful assignment of device EID the traffic will correctly route in the global device without requiring an indicator.

The net result of the compression schemes is a simple modification to the MCTP header that does not impact existing endpoint devices yet enables adding up to ~262,000 routable endpoints (10-bit domain ID, each with about 256 devices) over today's maxed out limit of about 255. Given the fact that it is unlikely for the Version field 516 and 520 to have 256 MCTP versions, additional bits to encode Domain ID could be stolen from this field. If this scalability is insufficient, the non-compressed method presented earlier allows theoretically unlimited scalability.

Figure 6:
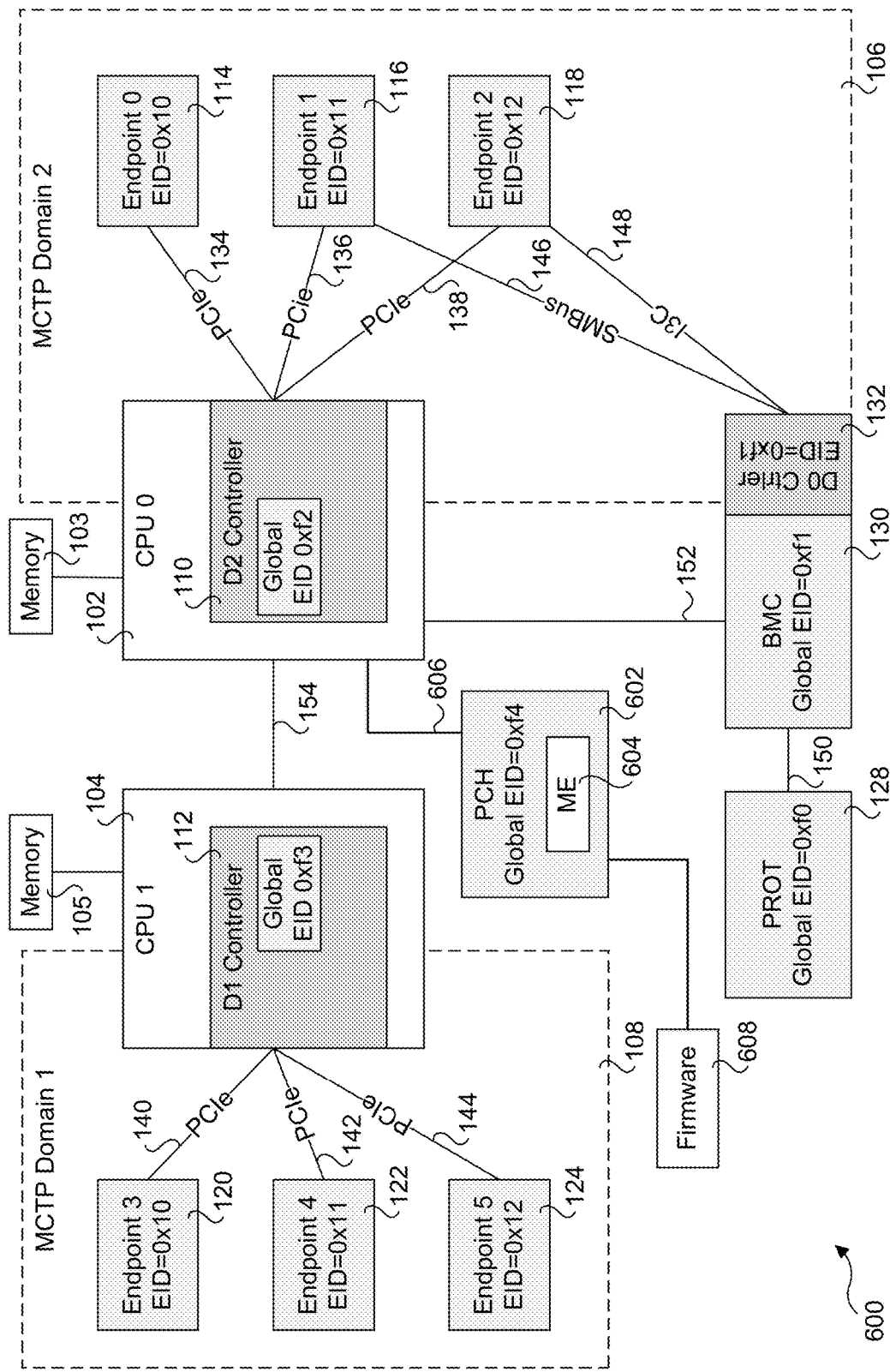
FIG. 6 is a schematic diagram of the two-socket system of FIG. 1, further including a Platform Controller Hub (PCH).

In some embodiments, a compute system or platform may include a platform controller hub (PCH) or other chipset component that is used to support I/O interfaces and provide other functions that are offloaded from the CPUs. A system 600 including a PCH 604 is shown in FIG. 6. PCH 602 includes a Management Engine (ME) 604 and is coupled to CPU 102 via a link 606 (such as but not limited to a Direct Media Interface link). A firmware storage device 608 in which system/platform firmware is stored is coupled to PCH 608.

Generally, EIDs for the domain devices within a given MCTP domain may be assigned using conventional MCTP EID assignment mechanisms, such as the Topmost Bus Owner defined in the current MCTP specification (v1.3). Each domain would use an independent and dedicated instance of the Topmost Bus Owner. Global EID assignments may be implemented using logic on the platform which would implement an instance of the Topmost Bus Owner. In one embodiment, ME 604 is used to assign global EIDs. In one embodiment, this functionality is enabled via execution of a portion of the system/platform firmware by the ME. In another embodiment, global EID assignment is facilitated by one of the system Domain Controllers.

Under some existing or future platform architectures, there may be more than one instance of the global devices illustrated above, such as multiple BMCs, for instance. Predictions call for greater number of CPUs, XPUs, as well as tile-based architectures employing "dielets" or "chiplets." Under these architectures, there may be configuration under which an endpoint device is outside of MCTP domains, yet also is not a global device, per se. Accordingly, such devices are referred to herein including the claims as a non-domain endpoint device, which means just that—it is an endpoint device that does not belong to any specific MCTP domain.

In addition to MCTP infrastructure using processors/CPUs, the teaching and principles disclosed herein may be applied to Other Processing Units (collectively termed XPUs) including one or more of Graphic Processor Units (GPUs) or General Purpose GPUs (GP-GPUs), Tensor Processing Units (TPUs), Data Processor Units (DPUs), Infrastructure Processing Units (IPUs), Artificial Intelligence (AI) processors or AI inference units and/or other accelerators, FPGAs (Field Programmable Gate Arrays) and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

The approaches described and illustrated herein provide several advantages over conventional MCTP and proposed MCTPv2 (version 2) ideas being discussed by the DMTF WG. Notably, the current limit of approximately 256 endpoints is eliminated—there is (substantially) unlimited scalability using the multi-level encapsulation approach discussed above, or a practical limit of approximately 262,000 endpoints using a single hierarchy with compressed headers.

No new defects, added cost, or adoption delays thanks to endpoints or bridges needing no change or little change. This may provide the biggest advantage from the broad industry perspective as numerous MCTPv1 endpoints are in the market and in the field today and they will simply continue to work. In contrast, the MCTPv2 idea emerging in DMTF WG discussions requires all the endpoint devices to be changed and this typically means hardware changes, not just firmware.

Specification adoption schedule and cost. The concepts and solutions provided herein could be defined as an MCTP specification appendix (or in a separate document) that does not change the MCTP base: the whole MCTPv1 stack as exists today needs no modification and will continue to work. In contrast, the MCTPv2 idea emerging in DMTF is a huge effort and compatibility issue because MCTPv2 would completely reinvent the MCTP base layer and also it would require some changes in the lower- and upper-layer protocols. It is a huge task for the standards organization to modify such a protocol stack.

Low number of impacted global devices: there is a relatively small number of platform devices (e.g., processors, BMC, PROT, IPU, potentially NIC) that need to be aware of the multi-domain architecture. Only these devices need to change with the scale of the system and the DC-to-DC forwarding mechanism further reduces the number of impacted devices (e.g., makes it possible to establish communication between a legacy IPU and a legacy NIC).

Low implementation cost and quick adoption by impacted global devices: the proposed solution leverages the already existing MCTPv1 infrastructure that the global devices implement. Since the embodiments leverage the already existing infrastructure, especially logic implemented in the hardware, it minimizes the cost and timeline of the adoption. In many implementations of the global devices, firmware changes will be sufficient.

The solution maintains compatibility with MCTPv1 devices, even those that incorrectly interpreted the Version field, which is a known issue for some devices already deployed in the field. Such devices would misbehave with the MCTPv2 ideas proposed at DMTF, unless some mechanisms beyond MCTP Base Specification are used.

The solution may implement an additional level of isolation to increase the security of the MCTP network. Devices in one domain cannot snoop or communicate with devices in other domains unless explicitly enabled by the Domain Controllers. This has security benefits not possible today with MCTPv1 or even with MCTPv2 ideas proposed at DMTF.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in the figures, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor, processing element, or the like. Thus, embodiments of this invention may be used as or to support a software program, software modules, firmware, and/or distributed software executed upon some form of processor, processing core or embedded logic running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software or firmware running on a processing element, via embedded hardware or the like, or any combination of hardware and software. Such components may be implemented as software modules, hardware modules, special-purpose hardware (e.g., application specific hardware, ASICs, DSPs, etc.), embedded controllers, programmable logic (e.g., Field Programmable Gate Arrays (FPGAs), hardwired circuitry, hardware logic, or other forms of embedded logic know in the art. Software and/or firmware content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer system, comprising:
   a plurality of processors, a respective processor including a respective domain controller and coupled to a respect set of one or more domain endpoint devices via respective links;
   one or more interconnects, coupled between pairs of processors; and
   one or more non-domain endpoint devices communicatively coupled either directly or indirectly to at least one processor,
   wherein the computer system is configured to implement multiple MCTP (Management Control Transport Protocol) domains, each MCTP domain employing at least one domain controller and employing 8-bit device Endpoint Identifiers (EIDs) to uniquely identify domain endpoint devices within the MCTP domain, and
   wherein the one or more non-domain endpoint devices are enabled to send data to and receive data from domain endpoint devices in each of the multiple MCTP domains.

2. The computer system of claim 1, wherein the domain controllers and the one of the one or more non-domain endpoint devices are associated with a unique 8-bit EID.

3. The compute system of claim 1, wherein the one or more non-domain endpoint devices include a one or more of a BMC (Baseboard Management Controller), Infrastructure Processing Unit (IPU), Smart NIC (Network Interface Controller), Debugger, or PROT (Platform Root or Trust).

4. The compute system of claim 3, wherein the BMC includes a domain controller that is coupled to one or more domain endpoint devices via a respective direct link between the BMC and the domain endpoint device.

5. The compute system of claim 1, wherein the non-domain endpoint devices comprise a global endpoint device, and wherein communication between domain endpoint devices and non-domain endpoint devices is implemented using messages having a format comprising:
   an outer header including a destination EID field and a source EID field; and
   an MCTP packet including an inner header having a destination EID field for a destined domain endpoint device and a source EID field for a source domain endpoint device.

6. The compute system of claim 1, wherein communication between domain endpoint devices and non-domain endpoint devices is implemented using messages employing physical MCTP addressing using one of more of PCIe Bus:Device:Function notation and Route to Root Complex routing.

7. The compute system of claim 1, wherein the non-domain endpoint devices comprise a global endpoint device, and wherein communication between domain endpoint devices and non-domain endpoint devices is implemented using messages comprising an augmented MCTP packet having a global destination EID stored in a destination endpoint ID field and an in-domain EID for a source or destination domain endpoint device stored in a source endpoint ID field.

8. The compute system of claim 7, wherein the augmented MCTP packet further includes a Tunnel ID or Domain ID stored in an MCTP reserved field.

9. The compute system of claim 1, wherein the non-domain endpoint devices comprise a global endpoint device, and wherein communication from a global endpoint device destined to a domain endpoint device is implemented using a message comprising an augmented MCTP packet having a global destination EID for a domain controller and a Tunnel ID stored in a destination endpoint ID field and an in-domain EID for the domain endpoint device stored in a source endpoint ID field,
   wherein the message is sent from the global endpoint device to the domain controller having the global destination EID, and wherein the message is forwarded from the domain controller to the domain endpoint device.

10. The compute system of claim 1, wherein the non-domain endpoint devices comprise a global endpoint device, and wherein communication from a source domain endpoint device destined for a global endpoint device is implemented using a message comprising an augmented MCTP packet having a global destination EID for the destined global endpoint device and a Domain ID stored in a destination endpoint ID field and an in-domain EID for the domain endpoint device stored in a source endpoint ID field,
   wherein the message is sent from the source domain endpoint device to a domain controller, and wherein the message is forwarded from the domain controller to the destined global endpoint device.

11. The compute system of claim 1, wherein the plurality of processors include one or more of a Central Processing Unit (CPU), a Graphic Processor Unit (GPU), a Tensor Processing Unit (TPU), a Data Processor Unit (DPU), an Infrastructure Processing Unit (IPU), an Artificial Intelligence (AI) processor, an AI inference unit, and a Field Programmable Gate Array (FPGA).

12. A method implemented by a system including a plurality of processors, each processor including a respective domain controller and coupled to a respective set of one or more domain endpoint devices via respective links, the system further including one or more non-domain endpoint devices, respective non-domain endpoint devices communicatively coupled either directly or indirectly to at least one processor, the method comprising:
 implementing multiple MCTP (Management Control Transport Protocol) domains, each MCTP domain employing a domain controller in a respective processor and employing 8-bit device Endpoint Identifiers (EIDs) to uniquely identify domain endpoint devices within the MCTP domain; and
 enabling the one or more non-domain endpoint devices to communicate with domain endpoint devices in each of the multiple MCTP domains.

13. The method of claim 12, further comprising:
 implementing a tunneled connection between a non-domain endpoint device and a domain endpoint device; and
 transferring tunneled messages between the non-domain endpoint device and the domain endpoint device using the tunneled connection,
 wherein the tunneled connection traverses the domain controller in the processor associated with the MCTP domain including the domain endpoint device.

14. The method of claim 13, wherein the non-domain endpoint device comprises a global endpoint device, and wherein the messages have a format comprising:
 an outer header including a global destination EID field and a global source EID field; and
 an MCTP packet including an inner header having a destination EID field for a destined domain endpoint device and a source EID field for a source domain endpoint device;
 wherein messages sent from the global endpoint device to the domain endpoint device employ the global source EID.

15. The method of claim 13, wherein the non-domain endpoint device comprises a global endpoint device, and wherein the messages comprise an augmented MCTP packet having a global destination EID stored in a destination endpoint ID field and an in-domain EID for a source or destination domain endpoint device stored in a source endpoint ID field.

16. The method of claim 15, wherein the augmented MCTP packet further includes a Tunnel ID or Domain ID stored in an MCTP reserved field.

17. The method of claim 13, wherein the non-domain endpoint device comprises a global endpoint device, and wherein messages transferred from the global endpoint device destined to the domain endpoint device comprise an augmented MCTP packet having a global destination EID for a domain controller and a Tunnel ID stored in a destination endpoint ID field and an in-domain EID for the domain endpoint device stored in a source endpoint ID field, wherein the messages are sent from the global endpoint device to the domain controller having the global destination EID, and wherein the message is forwarded from the domain controller to the domain endpoint device.

18. The method of claim 13, wherein the non-domain endpoint device comprises a global endpoint device, and wherein messages transferred from a source domain endpoint device destined for a global endpoint device comprise an augmented MCTP packet having a global destination EID for the destined global endpoint device and a Domain ID stored in a destination endpoint ID field and an in-domain EID for the domain endpoint device stored in a source endpoint ID field,
 wherein the message is sent from the source domain endpoint device to a domain controller in a processor coupled to the source domain endpoint device, and wherein the message is forwarded from the domain controller to the destined global endpoint device.

19. The method of claim 12, further comprising:
 implementing a tunneled connection between a first domain endpoint device in a first MCTP domain to a second domain endpoint device in a second MCTP domain; and
 transferring tunneled messages between the first domain endpoint device and the second domain endpoint device using the tunneled connection,
 wherein the tunneled connection traverses domain controllers in the first MCTP domain and the second MCTP domain.

20. A processor, having an MCTP (Management Control Transport Protocol) domain controller and a plurality of Input/Output (I/O) interfaces configured to be coupled to respective domain endpoint devices and a global endpoint device when installed in a first socket in a multi-socket computer system, wherein the MCTP domain controller is configured to:
 implement an MCTP domain that is operated independent from at least one other MCTP domain implemented by an MCTP domain controller in a second processor installed in a second socket in the multi-socket computer system, wherein the MCTP domain employs 8-bit device Endpoint Identifiers (EIDs) to uniquely identify the domain endpoint devices within the MCTP domain, and a global EID for the global endpoint device.

21. The processor of claim 20, wherein the MCTP domain controller is configured to:
 implement a tunneled connection between the global endpoint device and a domain endpoint device; and
 operate as a proxy for the tunneled connection, wherein messages sent from the global endpoint device and having a destination EID corresponding to the domain endpoint device are received at the MCTP domain controller and forwarded to the domain endpoint device using a conventional MCTP forwarding mechanism.

22. The processor of claim 21, wherein the MCTP domain controller is further configured to operate as a proxy for messages sent from the domain endpoint device and including a destination EID correspond to the EID of the global endpoint device, wherein upon receipt of the messages from the domain endpoint device the messages are forwarding to the global endpoint device.

23. The processor of claim 20, wherein the MCTP domain controller is configured to:
 proxy messages originating from the global endpoint device to domain endpoint devices based on destination device EIDs in the messages; and proxy messages originating from domain endpoint devices to the global endpoint devices based on a global destination EID in the messages corresponding to the global EID for the global endpoint device.

* * * * *